United States Patent
Joshi et al.

(10) Patent No.: US 10,384,865 B2
(45) Date of Patent: Aug. 20, 2019

(54) METHOD OF FABRICATION OF COLLAPSIBLE STORAGE TANK

(71) Applicant: GTA Containers, Inc., South Bend, IN (US)

(72) Inventors: Yatish J. Joshi, South Bend, IN (US); Simon T. Addicott, Mishawaka, IN (US); Louise E. Addicott, South Bend, IN (US)

( * ) Notice: Subject to any disclaimer, the term of this patent is extended or adjusted under 35 U.S.C. 154(b) by 0 days.

(21) Appl. No.: 15/606,989

(22) Filed: May 26, 2017

(65) Prior Publication Data
US 2017/0259991 A1 Sep. 14, 2017

Related U.S. Application Data

(62) Division of application No. 13/692,028, filed on Dec. 3, 2012, now Pat. No. 9,663,290.
(60) Provisional application No. 61/565,638, filed on Dec. 1, 2011.

(51) Int. Cl.
*B65D 88/16* (2006.01)
*B23P 11/00* (2006.01)
*B65D 90/08* (2006.01)

(52) U.S. Cl.
CPC .......... *B65D 88/1656* (2013.01); *B23P 11/00* (2013.01); *B65D 88/16* (2013.01); *B65D 90/08* (2013.01); *Y10T 29/49826* (2015.01)

(58) Field of Classification Search
CPC .... B65D 88/1656; B65D 88/16; B65D 90/08; B23P 11/00
See application file for complete search history.

(56) References Cited

U.S. PATENT DOCUMENTS

| | | | | |
|---|---|---|---|---|
| 3,470,928 A * | 10/1969 | Schwartz | ............... | D03D 15/00 139/389 |
| 4,468,812 A * | 8/1984 | Grosvenor | ............. | B32B 27/12 383/108 |
| 4,630,650 A * | 12/1986 | Davis | ...................... | F16L 11/16 138/129 |
| 5,302,457 A * | 4/1994 | Sheahan | ............. | B29C 65/5042 428/112 |
| 6,056,438 A * | 5/2000 | Bradley | .................... | E02B 3/04 112/475.08 |
| 6,199,676 B1 * | 3/2001 | Targiroff | ................ | B64D 25/14 156/322 |
| 7,891,914 B2 * | 2/2011 | Smallwood | ........... | E02D 17/202 383/107 |

(Continued)

*Primary Examiner* — Derek J Battisti
(74) *Attorney, Agent, or Firm* — Daniel Tychonievich

(57) ABSTRACT

In one embodiment, a collapsible, flexible storage tank is provided that is capable of holding a liquid material. The tank includes a sheet of flexible, moisture impervious side wall material; at least one opening for receiving a fitting to fill and drain the tank; joining seams wherein edges of the sheet are joined, the seams extending about the tank in a spiral orientation; and closing seams wherein the side ends of the pillow tank are sealed. In another aspect, a collapsible, flexible storage tank is capable of holding a liquid. The tank includes a sheet of flexible side wall material; at least one opening for receiving a fitting to fill and drain the tank; and butt seams wherein edges of the flexible sheet are joined together in the same plane in a butt joint configuration using an overlapping piece of flexible, moisture impervious sealed material over the top thereof.

7 Claims, 2 Drawing Sheets

(56) References Cited

U.S. PATENT DOCUMENTS

| | | | | |
|---|---|---|---|---|
| 2005/0070187 A1* | 3/2005 | Cavenagh | .............. | E04C 3/34 |
| | | | | 442/185 |
| 2007/0019891 A1* | 1/2007 | Daniel | .............. | B65D 85/07 |
| | | | | 383/105 |
| 2009/0317580 A1* | 12/2009 | Roiser | .............. | A41D 27/245 |
| | | | | 428/61 |
| 2011/0019940 A1* | 1/2011 | Strack | .............. | B65D 3/06 |
| | | | | 383/42 |

* cited by examiner

METHOD OF FABRICATION OF COLLAPSIBLE STORAGE TANK

This application is a divisional application claiming priority from non-provisional U.S. patent application Ser. No. 13/692,028 filed Dec. 3, 2012 and U.S. Provisional Patent Application Ser. No. 61/565,638 filed Dec. 1, 2011, the complete disclosures of which are hereby expressly incorporated by reference.

BACKGROUND OF THE INVENTION

This invention relates to a design and method of fabrication of a collapsible, flexible storage tank; and in particular, to a flexible storage tank of the pillow tank variety that includes seams that are formed in a spiral configuration about the pillow tank.

It is often desirable to have a container storage tank capable of holding a liquid such that when there is no liquid in the container, it may be collapsed or folded for ease of transportation and storage. Collapsible liquid containers have been available for some time and encompass a variety of designs. One example of an early collapsible container of the pillow tank variety is found in U.S. Pat. No. 2,724,418 to Krupp, which is incorporated in its entirety herein by reference. Krupp discloses a flexible container that includes a volume responsive pressure relief valve and overflow valve assembly. In addition, the tank in Krupp includes a connector fitting, an attachable cap fitting for filling a drain in a tank. The tank also includes attached flexible handles. The containers are made from a flexible sheet material having an intermediate layer or a plurality thereof of square-woven textile fabric sheet material of cotton, nylon, rayon, glass fibers or other suitable filamentary material having the desired strength characteristics. The material is coated or treated with a suitable natural or synthetic rubber composition. The material may also include an outer protective layer of suitable rubber composition having age resisting and abrasion resisting characteristics, an inner layer of gasoline resistant rubber compositions, such as, for example, a copolymer of butadiene and acrylonitrile or a neoprene. The container is assembled by joining and adhering in a suitable known manner, including a plurality of pre-cut patterns of suitable flexible sheet material. The materials are joined in laterally extending seams of overlapped, fabric tape reinforced construction.

Another form of flexible container is found in U.S. Pat. No. 3,510,142 to Erke, which is incorporated in its entirety, herein by reference. Erke discloses a portable, collapsible tank having an inflatable double walled construction with tie down means secured thereto. The tank in Erke has a double walled inflatable structure with one or more fill/drain ports. The tank is designed to receive and retain a variety of liquids or dry powder materials.

Another pillow tank is disclosed in U.S. Pat. No. 4,865,096 to Schober et al., which is incorporated in its entirety herein by reference. Schober et al. discloses a pillow tank with upper and lower sections, which are secured together along a seam extending around the mid section of the tank. A sleeve extends along a mid line of the entire perimeter of the seam. Slits or holes are formed through the sleeve to permit a rope to be threaded through portions of the sleeve to form tie-down points for the tank. The tank may also include exterior strapping in different configurations that can be sewn or secured to the tank for added strength. The tank is formed of a tube defined by an upper rectangular section and a lower rectangular section bonded together. Material for the tank may be typical elastomeric coated cloth panels, which may be square woven nylon cloth with a coating of neoprene or SBR rubber. Typical nylon cloth weights in a tank would be 5 and 13 ounces per square yard, although other weave patterns of nylon cloth can be used. Elastic coated aramid fibers may also be suitable material for manufacturing the tank.

Another flexible container is disclosed in U.S. Pat. No. 4,875,596 to Lohse, which is incorporated in its entirety herein by reference. The vessel in Lohse is designed for transporting or storing bulk materials or liquids and is shaped in the form of a tube having open ends tightly sealed by means of a straight line clamp or connection parts. The clamp connection parts are formed toothed rack-like so that, with relatively short clamp connections, tubes with relatively large openings can be sealed tightly.

U.S. Pat. No. 6,186,713 B1 to Bonerb discloses a bulk liquid freight transport vehicle, which is incorporated in its entirety herein by reference. The transport includes a collapsible liquid cargo bag and at least one adjustable cinching strap for being tightened down over the bag. Tightening of the strap over the bag causes the pressure of the liquid mass within the bag to increase to prevent motion of the liquid in the bag through motion of the vehicle.

A different type of flexible storage tank is disclosed in U.S. Pat. No. 6,842,955 B2 to Joshi et al., which is incorporated in its entirety herein by reference. The tank disclosed by Joshi et al., has a frusto-conical sidewall configuration and an open top. The tank is constructed of a material such as DuPont Elvaloy™, which is an ethylene-based polymer with reinforced synthetic fibers. Sections of the tank are joined using a heat sealing technique, such as radio frequency welding, ultrasonic heating, heating with hot air, electrical resistant heat, or other methods.

U.S. Patent Application Publication No. US 2009/0001085 A1 to Bartz et al. discloses a flexible tank, which is incorporated in its entirety herein by reference. The tank in Bartz et al. includes an internal baffle apparatus comprising a plurality of panel members connected along a connection line that defines an axis. Panel members extend in a diagonal fashion towards corners of the tank and also extending vertically between the top and bottom of the tank.

U.S. Pat. No. 7,717,296 B1 to Guthrie discloses a transportable and collapsible fabric tank with an integral balloon baffle system, which is incorporated in its entirety herein by reference. The tank in Guthrie is made from a fabric-composite-based material impregnated with polytetrafluoroethylene (PTFE). The internal baffles aid in the stability of the tank to prevent sloshing of the liquid while traveling with the tank partially filled. Internal baffles inflate to sizes large enough to force liquids out of the tank through the discharge valve.

Typical in this construction of prior art tanks, and especially large tanks, is the use of rectangular-shaped sheets that are sealed together along seams. This typically results in seams running longitudinally or laterally across the bottom and top of the tank. In addition, closing seams are also typically located along the side ends. In the longitudinal and lateral seams, there is typically a double thickness of material, where the material from adjacent sheets is overlapped and sealed together. In the side end seams, or closing seams of the tank, there is a triple or three-layer thickness in the area where the longitudinal seams meet the side end seams. Because of the problems in trying to properly seal this three-layered seam area, this is a potential leak path for flexible pillow tanks.

Accordingly, it is an object of the subject invention to reduce or minimize the number of seams, and in particular to eliminate or reduce the number of overlapping seams of triple thickness in material where longitudinal seams meet closing seams.

Another problem with prior art pillow tanks is that the lap joints that are standard for the longitudinal and latitudinal seams may present a leak path. In particular, if the interior lining layer is either damaged or degraded over time or through a lap end, the liquid, especially a corrosive liquid, such as fuel, may enter the middle fabric reinforced layer of the tank's wall and dissolve and propagate creating a leak path. This can be especially problematic in the area of a lap joint. Accordingly, it is another object of the present invention to provide butt joints/seams that are less susceptible to creating and/or providing a leak path for liquid contained in the tank than standard lap seams.

SUMMARY OF THE INVENTION

In one embodiment of the invention, a collapsible, flexible storage tank is provided that is capable of holding a liquid material. The tank includes a sheet of flexible, moisture impervious side wall material; at least one opening for receiving a fitting to fill and drain the tank; joining seams wherein edges of the sheet of material are joined, the seams extending about the tank in a spiral orientation; and closing seams wherein the side ends of the pillow tank are sealed. Only two or less joining seams encounter a closing seam at each end of the tank in one embodiment.

In another embodiment of the invention, a collapsible, flexible storage tank is provided that is capable of holding a liquid material that includes a sheet of flexible, moisture impervious side wall material; at least one opening for receiving a fitting to fill and drain the tank; and butt seams wherein edges of the flexible sheet of material are joined together in the same plane in a butt joint configuration using an overlapping piece of the flexible, moisture impervious sealed material over the top thereof. The collapsible, flexible storage tank may include a piece of sealing tape on the internal side of the butt joint. Alternately, a second piece of flexible, moisture impervious sealed material may be located along the inside of the seam. A filler material may be located between the edges of the flexible sheet of material in the butt seams.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein.

Figure 1:
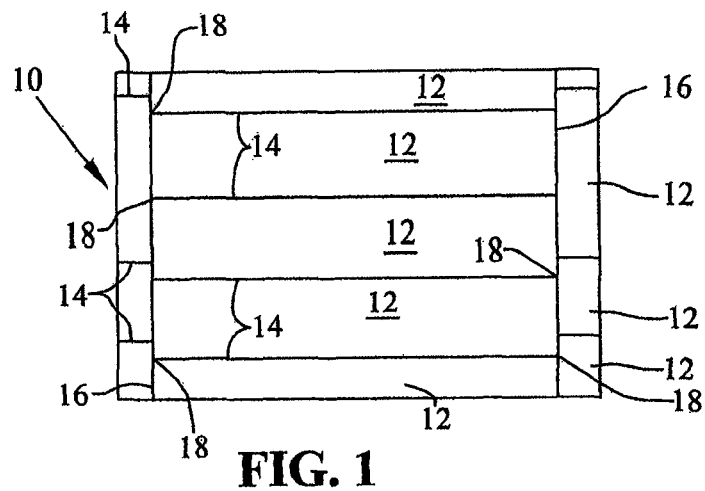
FIG. 1 is a plan view of a prior art pillow tank showing longitudinal seams intersecting with end or closing seams.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Figure 4:
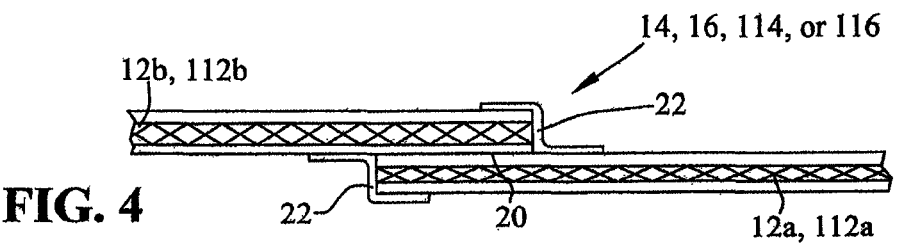
FIG. 4 is a cross sectional view of a prior art cross sectional longitudinal or latitudinal seam.

Now referring to FIG. 1, a prior art pillow tank is shown generally indicated as 10. Pillow tank 10 includes a plurality of rectangular sheets of flexible, moisture impervious material 12. In the embodiment shown, pillow tank 10 has eight sheets or panels 12. Panels 12 are joined along side edges thereof at overlapping longitudinal seams 14 as shown in FIG. 4. Pillow tank 10 also includes two side end or closing seams 16 extending perpendicular to longitudinal seams 14. As can be seen in FIG. 1, longitudinal seams 14 and closing seams 16 have the intersection points 18. In the embodiment of FIG. 1, including eight rectangular panels 12, there are a total of eight intersection points along each closing seam 16.

At each of the seams, material can be sealed or joined using numerous well known techniques including radiofrequency welding, ultrasonic heating, heating with hot air, or electrical resistance heating. As noted previously, at each of the intersection points 18, there is an overlapment between seams 14 and 16 such that there is an additional layer of material (i.e., three layers of material 12 at intersection points 18 as opposed to the two layers of overlapping material shown in FIG. 4 for the remainder of seams 14 and 16). As also discussed above, this tight intersection point of three layers of material presents one of the greatest risks of possible failure in pillow tank 10 due to the additional complications of sealing three layers of material in isolated spots. Accordingly, it is desirable to minimize the number of areas where three layers of material 12 are overlapping the seal.

Figure 2:
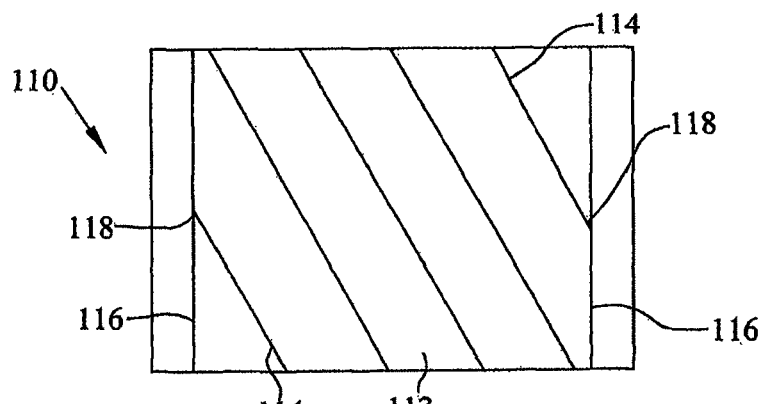
FIG. 2 is a plan view of one embodiment of a pillow tank in accordance with the present invention.
Figure 3:
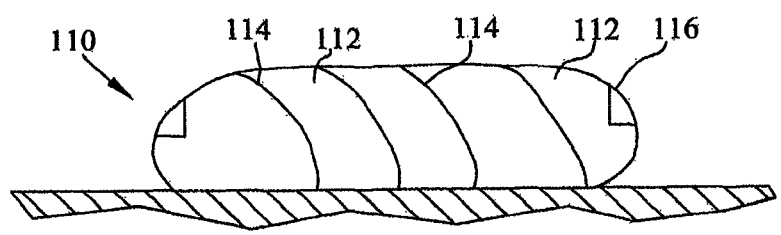
FIG. 3 is a side view of the pillow tank of FIG. 2.

As the sheets in material 12 are only commercially available in finite widths as defined between seams 14 in FIG. 1, an alternate design is required to reduce the number of intersection points 18 for a given size of tank. Accordingly, applicant has invented a new design for the construction and fabrication of a pillow tank as shown in FIGS. 2 and 3. Although the width of flexible, moisture impervious material is limited, the length of the material is usually not a restriction as it is available in rolls of extended length.

Therefore, to reduce the number of intersection points where longitudinal seams meet closing seams, applicant has developed a flexible pillow storage tank, generally indicated as 110 in FIGS. 2 and 3. Pillow tank 110 is manufactured from a sheet (or sheets) of flexible, moisture impervious material 112, which may be the same type used in known previous tanks 12. However, the ends of sheet material section 112 are cut at an angle and then wrapped and sealed along spiral seams 114 as shown in FIGS. 2 and 3. Spiral seams 114 may be of the lap type as previously known and shown in FIG. 4 or may encompass one of the alternate designs shown in FIGS. 6-8, discussed in further detail below.

Closing or end seams 118 are provided at the ends of pillow tank 110 similar to pillow tank 10; however, the depicted spiral design significantly reduces the number of intersection points 118 between closing seams 116 and spiral seams 114 as compared to longitudinal seams 14 and closing seams 16 in tank 10. As opposed to the eight intersection points 18 on each of the closing seams 16 in pillow tank 10, the design and manufacture of pillow tank 110 can limit the intersection points 118 to one or two along each closing seam 116 or even eliminate such intersection points altogether. This can be accomplished by having the spiral seam initiated at a place other than the ends of the tank. As discussed, reducing the number of intersection points reduces the area of isolated points of three layers of overlapping material, thereby reducing potential leak paths in tank 110.

The material and techniques used to construct tank 110 can be similar to that used for prior art tanks. One such suitable material is DuPont Elvaloy™, which is an ethylene-based polymer with reinforced synthetic fibers. Spiral seams 114 and closing seams 116 may be sealed using a heat sealing technique, such as radio frequency welding, ultrasonic heating, heating with hot air, electrical resisting heating or other known methods such as a chemical process like an adhesive.

Figure 5:
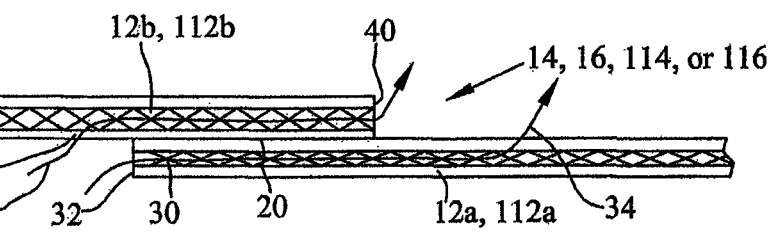
FIG. 5 is a cross sectional view of the butt joint seam of FIG. 4 showing the potential leak paths therethrough.

FIGS. 4 and 5 depict a standard lap joint seam as may be utilized for seams 14, 16, 114, or 116. The lap joint includes an area wherein side edges of the sheet material 112 is overlapped and joined together at 20 using one of the methods previously discussed or other methods known in the art. A sealing tape 22 may be adhered over the ends of the seam area 20 for additional sealing protection as shown in FIG. 4.

Now referring to FIG. 5, one potential problem with the prior art lap joint seam is shown. If a sealing tape is not used or becomes dislodged or partially dislodged, one potential leak path 30 may develop. In particular, and especially if the tank contains a corrosive liquid, an inner edge 32 of sheet material 12a, 112a may be susceptible to liquid entering the center area of the layer through the edge and propagating through the center of the layer as the fibers contained therein are dissolved. Furthermore, once the liquid has entered in the lower layer of material 12a or 112a, a complete leak path may be generated if through damage or deterioration an opening 34 is created in the outer region of lower sheet material 12a or 112a. In addition, another leak path 36 may also develop through the upper layer of material 12b or 112b in the area of the lap joint. If the inner surface of sheet material 12b or 112b develops an opening 38 through damage or degradation, liquid may leak and enter into the interior portion of the layer of sheet material 12 or 112 as shown in FIG. 5. As discussed previously, this may allow the liquid to propagate through the interior portion of the layer and out the edge 40 of upper layer 12b or 112b creating a leak in the tank.

Figure 6:
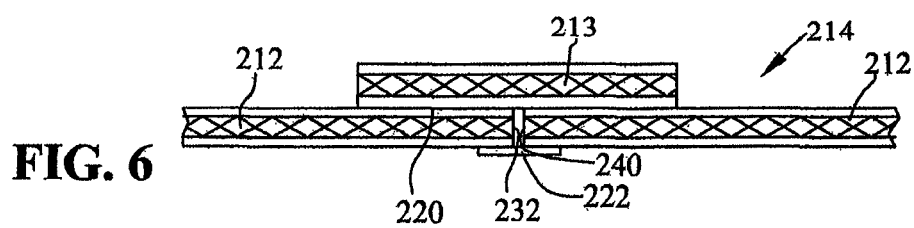
FIG. 6 is a cross sectional view of a butt joint seam of one embodiment of a butt joint seam in accordance with the subject invention.

Now referring to FIG. 6, an alternate seam assembly and design is generally indicated as 214. Seam design 214 has a butt joint configuration as opposed to the conventional lap joint seam depicted in FIG. 4 utilized in the prior art.

Joint seam 214 is constructed by locating ends of the sheet material 212 (which may be of a similar type of material as sheets 12 and 112) against one another so that inner edges 232 and 240 butt up against one another, and adjacent sections of sheet material 212 are oriented in the same plane as shown in FIG. 6. Then, a narrow sheet of material 213 of similar construction to sheet material 212 is located over the top of edges 232 and 240 and extends longitudinally along the length of the seam and laterally therefrom for a width great enough to create a solid weld or sealed joint 220 between sheet material 213 and sheets 212. The weld or sealed joint may be created using any of the previous methods heretofore described or known in the art. A sealing tape 222 may be placed over the interior portion of the seam. It should be appreciated that this design is less susceptible to creating a leak path than in the prior art lap joint design of FIGS. 4 and 5, as both edges 232 and 240 of the tank sheet material 212 are located internally to the tank underneath sealing sheet material 213.

Figure 7:
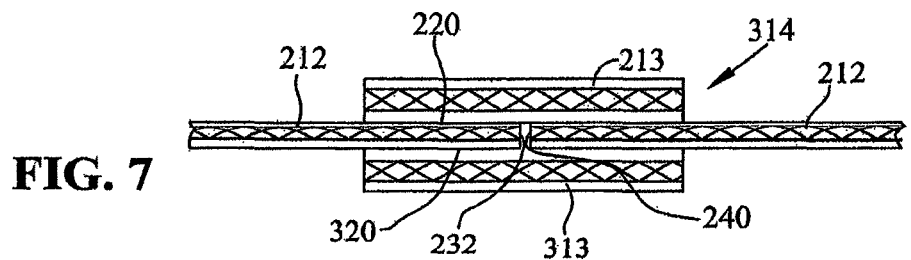
FIG. 7 is a cross sectional view of another embodiment of a butt joint in accordance with the subject invention.

FIG. 7 shows another design of a butt joint seam, generally indicated as 314. Butt joint 314 is similar to and constructed the same as butt joint 214, except that joint 314 also includes an additional inner sheet material member 313. Accordingly, an additional weld 320 is located between inner sheet material member 313 and sheet material 212 so that the inner edges 232 and 240 of sheets of material 212 are completely sealed by the material surrounding the butt joint. As can be seen, this creates an area of three layers of material thickness along the seams; however, this design does not present the localized problem of three layers of material at intersection points 18, as this three layers of material extend for the entire length of the seams.

Figure 8:
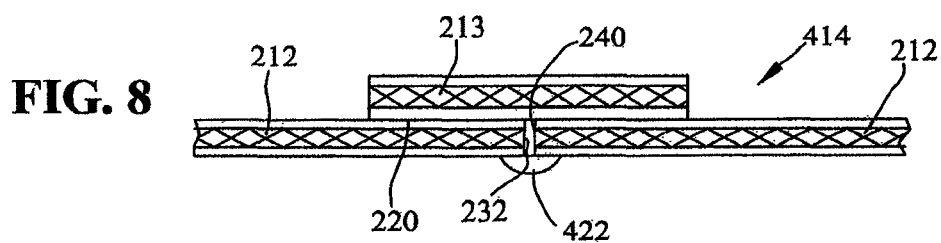
FIG. 8 is a cross sectional view of yet another embodiment of a butt joint in accordance with the subject invention.

Another alternate embodiment of a butt joint seam is depicted in FIG. 8, generally indicated as 414. Butt joint seam 414 is similar in most respects to butt joint seam 214 with the exception that a filler material 422 is placed between sheet material edges 232 and 240. Filler material 422 is a flexible, corrosive resistant material that provides additional sealing of edges 232 and 240 to prevent any liquid in the tank from encountering and entering the edges. Of course, a sealing tape (not shown) may also be placed over filler material 422 for additional protection.

While the invention has been taught with specific reference to these embodiments, one skilled in the art will recognize that changes can be made in form and detail without departing from the spirit and scope of the invention. The described embodiments are to be considered, therefore, in all respects only as illustrative and not restrictive. As such, the scope of the invention is indicated by the following claims rather than by the description.

The invention claimed is:
1. A method of fabricating a collapsible, flexible storage tank capable of holding a liquid material, including the steps of:
   providing an elongated sheet of flexible, moisture impervious side wall material;
   winding the sheet of material in a spiral orientation to form a side wall of the storage tank;
   providing first and second lengths of flexible, moisture impervious material constructed of the same material as the side wall material;
   butting together and joining edges of the sheet of side wall material to form a butt joint along a spiral seam about the tank;

placing the first length of the flexible, moisture impervious material over an exterior side of the butt joint;

placing the second length of the flexible, moisture impervious material over an interior side of the butt joint sealing the lengths of material to surfaces of the sheet of the side wall along the butt joint;

cutting ends of the sheet of side wall material to form straight side ends; and making closing seams wherein side ends of the flexible storage tank are sealed.

2. The method of fabricating a collapsible, flexible storage tank as set forth in claim 1, wherein only two or less spiral seams encounter a closing seam.

3. The method of fabricating a collapsible, flexible storage tank as set forth in claim 1, further including the step of placing a filler material between edges of the butt joint.

4. The method of fabricating a collapsible, flexible storage tank as set forth in claim 1, wherein the sheet of flexible, moisture impervious side wall material is a polymer with internal reinforcing synthetic fibers.

5. The method of fabricating a collapsible, flexible storage tank as set forth in claim 4 wherein the construction is such that any liquid that leaks into the internal reinforcing synthetic fibers of the side wall material has no leak path out of the tank.

6. The method of fabricating a collapsible, flexible storage tank as set forth in claim 3, wherein the filler material forms a cap and extends over the joining edges along and in contact with an outer surface of the sheet of side wall material.

7. The method of fabricating a collapsible, flexible storage tank as set forth in claim 6, wherein the cap is located on and extends over the joining edges on the interior side of the sheet of side wall material.

* * * * *